United States Patent [19]
Mauro et al.

[11] Patent Number: 5,634,144
[45] Date of Patent: May 27, 1997

[54] LIGHT BEAM COMMUNICATION METHOD AND SYSTEM FOR LINKING A CAMERA AND A COMPUTER

[75] Inventors: Edward C. Mauro, Rochester; Constantine N. Anagnostopoulos, Mendon, both of N.Y.

[73] Assignee: Eastman Kodak Company, Rochester, N.Y.

[21] Appl. No.: 268,691

[22] Filed: Jun. 29, 1994

Related U.S. Application Data

[63] Continuation-in-part of Ser. No. 21,416, Feb. 23, 1993, abandoned.

[51] Int. Cl.⁶ .................................................. G03B 17/00
[52] U.S. Cl. .................................. 396/57; 396/106
[58] Field of Search ........................ 354/400, 402, 354/403, 412, 266; 396/56, 57, 58, 59, 106

[56] References Cited

U.S. PATENT DOCUMENTS

| | | | |
|---|---|---|---|
| 5,097,283 | 3/1992 | Kazumi | 354/412 |
| 5,172,155 | 12/1992 | Kosaka | 354/266 |
| 5,187,517 | 2/1993 | Miyasaka | 354/412 |
| 5,198,849 | 3/1993 | Hirai | 396/57 |
| 5,198,851 | 3/1993 | Ogawa | 354/412 |
| 5,247,327 | 9/1993 | Suzuka et al. | 354/266 |

Primary Examiner—Russell E. Adams
Attorney, Agent, or Firm—Raymond L. Owens

[57] ABSTRACT

A method and system for light beam communication between a camera and a computer is provided by adapting an existing light beam auto-focus system of a conventional automated camera, such as a conventional automated film-based camera or a conventional automated electronic camera, and by adapting a conventional computer to provide a light beam communication linkage with the adapted camera. The light beam auto-focus system of such automated cameras is modified to include a mode selector providing a selection of the conventional light beam auto-focus mode and alternatively for selection of a light beam communication mode. The camera has a microprocessor and an erasable electrically programmable read-only memory (EEPROM). In the light beam communication mode, a light beam emitter driver circuit and a light beam sensor timing circuit and signal processor are provided. A conventional computer, for example, a desktop computer or a laptop computer, is adapted to receive and to transmit optically encoded digital signals whereby a computer-based light beam sensor and light beam emitter have an optical spectrum overlapping with the optical spectrum of the camera-based light beam emitter and light beam sensor. Light beam communication is initiated by suitable commands provided by a camera user to the computer. The camera microprocessor is responsive to such commands, and that response is transmitted by the camera-based light beam emitter back to the computer-based light beam sensor.

9 Claims, 8 Drawing Sheets

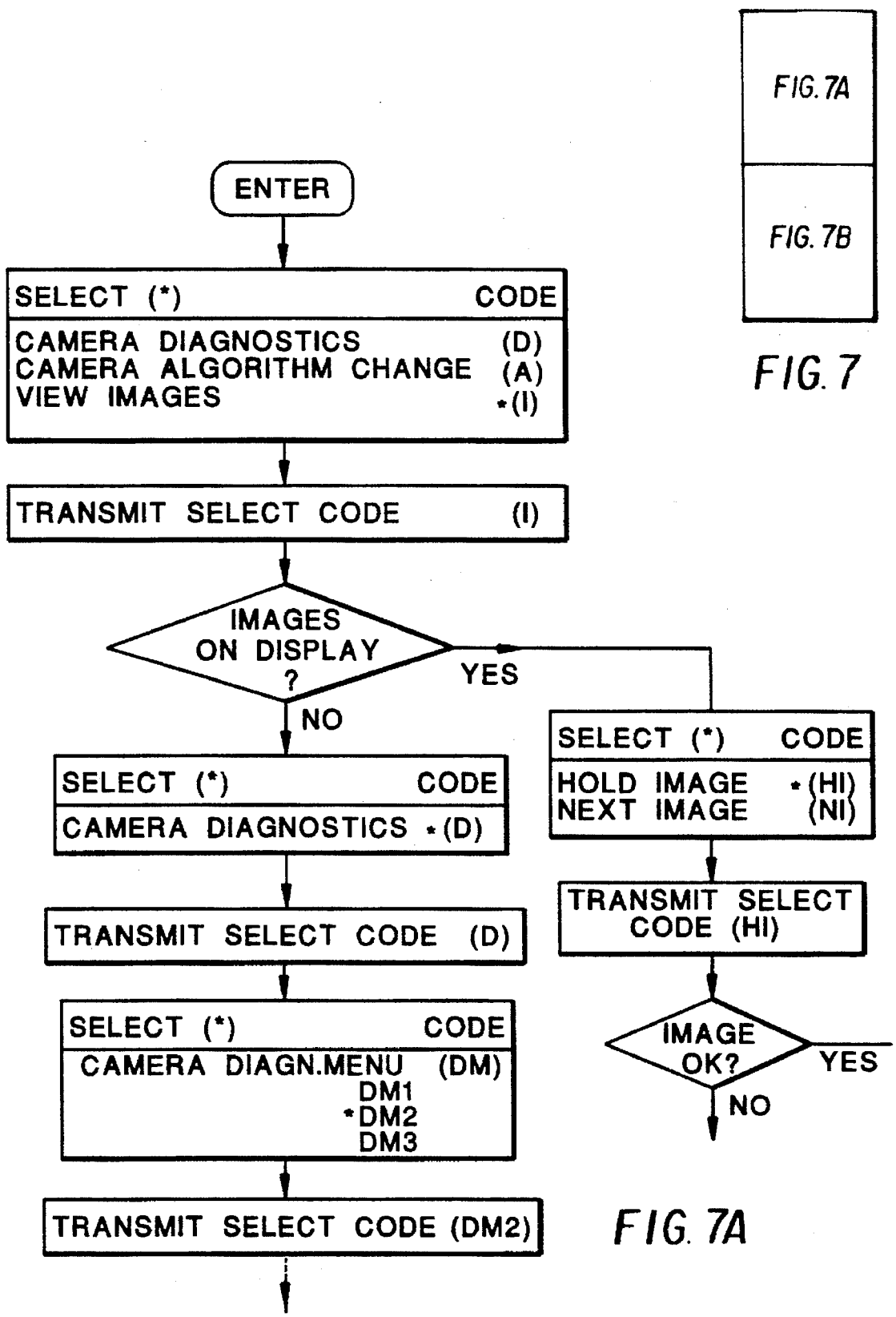

LIGHT BEAM COMMUNICATION METHOD AND SYSTEM FOR LINKING A CAMERA AND A COMPUTER

CROSS REFERENCE TO RELATED APPLICATION

This application is a continuation-in-part of U.S. Ser. No. 08/021,416 Filed Feb. 23, 1993, now abandoned entitled "A Method For Linking a Camera and a Computer" by Maruo et at, the disclosure of which is incorporated herein.

FIELD OF THE INVENTION

This invention relates to light beam communication between an automated camera and a computer, and more particularly to an automated camera having a light beam auto-focus system adapted for communicating with a computer which is adapted to communicating with the components of the camera's light beam auto-focus system.

DESCRIPTION OF THE RELATED ART

In automated film-type cameras or in automated all-electronic cameras, sensors and associated circuits within the camera evaluate a scene to be photographed, and determine various parameters of camera settings, based on hard-wired or software algorithms resident within the camera. Such parameters are, for example, the exposure time, the lens aperture, the lens focus, and whether a flash unit should be activated. These camera algorithms have been developed by the camera designer. Alternatively, these algorithms are conveyed to a once-programmable read only memory (PROM) within the camera from a cable-connected computer in the form of custom tailored control constants as part of the camera manufacturing process, as disclosed in U.S. Pat. No. 4,423,934, issued Jan. 3, 1984 to Lambeth, et. al. These approaches to providing permanent algorithms into once-programmable read only memories (PROM) are based on statistical studies of many photographs taken by a random collection of amateur photographers. The primary shortcoming of this approach is that such camera algorithms, while valid on the average, are not generally optimum for each individual camera user or photographic situation. In order to adapt automated cameras to function under unusual photographic conditions, several options have been developed which allow the camera user to change the picture-taking algorithm to adapt the camera to such unusual photographic conditions. For example, there are cameras described in U.S. Pat. No. 4,855,779 which allow the user to change the picture-taking algorithm by replacing an electronic board within the camera. In U.S. Pat. No. 4,853,733, issued Aug. 1, 1989 to Watanabe et. al., and titled "Program Rewritable Camera," there is disclosed a first camera memory and an input circuit which allow the rewriting of coded control orders into the first memory by a peripheral device which is cable-connected to the camera. Changing camera components, such as an electronic board, is similar to having a manually operated camera. Linking a camera to a peripheral device by cables, connectors, and adaptors may make this cable connection subject to electrical or mechanical contact failure between the prongs and receptacles of the plugs or connectors in such a cable-connected system. Additionally, a cable connection between a camera and a computer may be inconvenient in that it requires the camera user to provide the connecting components at all times when algorithm changes in the camera are contemplated.

Accordingly, it would be desirable to provide a communication linkage between an automated camera and an computer which does not rely on a cable connection or on a change of camera components.

It would be particularly desirable to utilize a light beam automatic-focus system of an automated camera as a light beam communication means between the camera and a computer, the computer being adapted to transmit a coded light beam signal to a light beam sensor in the camera and to receive a coded light beam signal from a light beam emitter in the camera.

SUMMARY OF THE INVENTION

Viewed from one aspect, the present invention provides a method for light beam communication linking an automated camera having a light beam auto-focus system, the light beam auto-focus system adapted to be selectably used in a light beam communication mode, and a computer adapted to light beam communication with the adapted camera.

Viewed from another aspect, the present invention provides a system of light beam communication between an automated camera and a computer, the camera having a light beam auto-focus system adapted to be selectably used in a light beam communication mode and alternatively in a light beam auto-focus mode, linking the camera in the communication mode communicatively to the computer which has been adapted for light beam communication with the camera.

Viewed from a further aspect, the present invention provides a light beam communication method and system for linking a camera and a computer in a selectable communication mode, the communication mode providing for light beam communication of computer-initiated commands to an erasable electrically programmable read only memory (EEPROM) and a microprocessor in the camera, and providing for light beam communication from the camera to the computer responsive to the computer-initiated commands.

Viewed from a further aspect, the present invention provides a light beam communication method and system for communicating command instructions from a computer to a camera, the command instructions including commands for a camera response related to camera status, and command instructions providing alternative camera function.

Viewed from a still further aspect, the present invention provides a light beam communication method and system linking an electronic solid-state image sensor based camera (subsequently referred to as an "electronic camera") and a computer in which command instructions initiated by the computer include instructions to direct the electronic camera to transmit to the computer image information related to photographic images stored in an image pixel signal storage of the camera.

The instant invention will be better understood and more fully appreciated from the following detailed description of specific embodiments when viewed in conjunction with the accompanying drawings and the claims.

DETAILED DESCRIPTION

Figure 1:
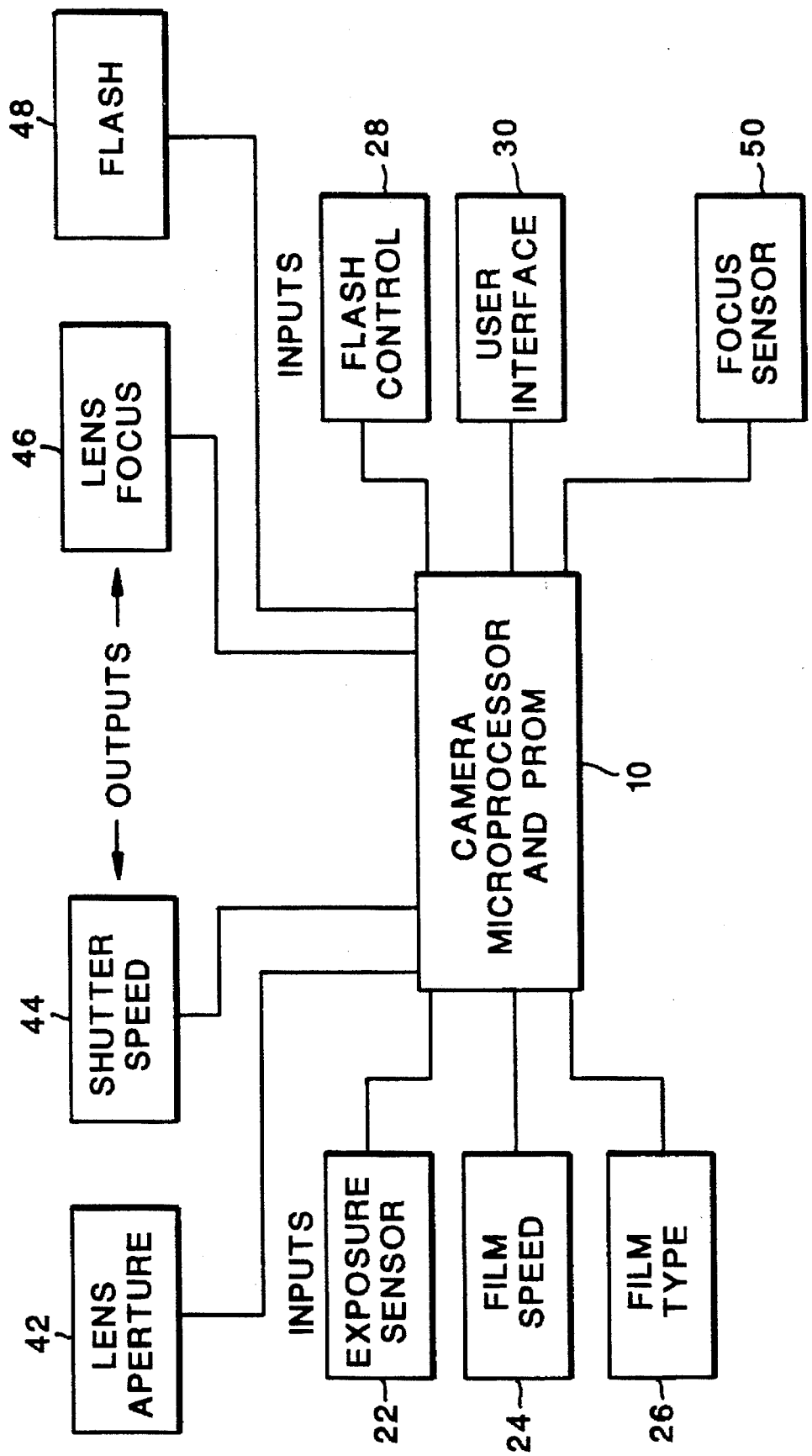
FIG. 1 is a schematic diagram of a prior an automated camera in which input functions are translated into camera output functions by a camera microprocessor receiving instructions from a permanently programmed memory.

FIG. 1 shows a block diagram of a prior art automated camera which includes a conventional camera microprocessor and once-programmable read-only memory (PROM) 10, where the camera algorithms are stored in the non-volatile PROM. Alternatively, the custom control constants disclosed in the aforementioned U.S. Pat. No. 4,423,934 are resident in the PROM in addition to nominal camera algorithms. The conventional microprocessor 10 receives inputs from a conventional exposure sensor 22, a conventional film-speed indicator 24, a conventional film-type indicator 26, a conventional flash control unit 28, a user interface 30, and a focus sensor 50. The user interface 30 typically permits a camera user to bypass one or several of the algorithms stored in the PROM. For example, user interface 30 may be a means for user election of the flash mode, such as the choice of not using a flash at all, or using a so-called fill-in flash during every exposure, or using a full flash when desired. Typically, such a user interface 30 is accessed by a push-button or switch means on the outside of a camera body. In such a conventional automated camera, the microprocessor 10 based on these inputs and based on the PROM-stored picture-taking algorithms control the outputs or picture characteristic units which, in turn, control the characteristics of the picture or photograph being taken. These outputs or picture characteristic units include a lens aperture unit 42, a shutter speed control unit 44, a lens focus unit 46, and a flash unit 48. A preprogrammed automated prior art camera as depicted in FIG. 1 functions adequately under most "normal" picture-taking situations.

Figure 2:
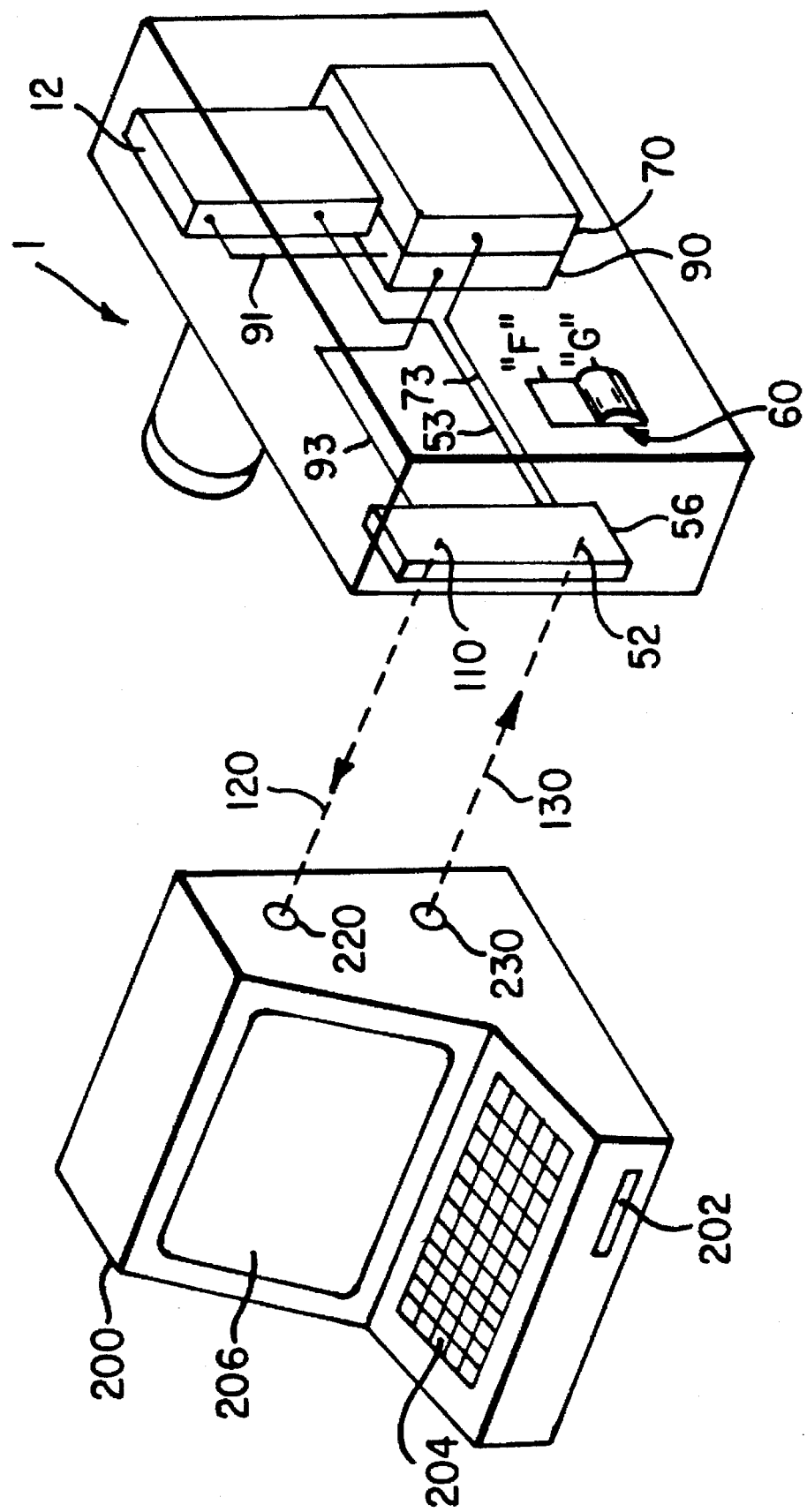
FIG. 2 is a schematic perspective view of a light beam communication system linking an automated camera to a computer in accordance with the present invention.

Referring now to FIG. 2, there is shown a schematic perspective view of an automated camera 1 in a light beam communication linkage with a conventional computer 200. Camera 1, as distinguished from automated prior art cameras, has a light beam emitter 110 and a light beam sensor 52, schematically depicted as mounted on a common circuit board substrate 56, the emitter and sensor facing toward computer 200. The camera 1 and the computer 200 are positioned with respect to each other such that the camera's light beam emitter 110 is aligned with and facing the computer's light beam sensor 220, and the computer's light beam emitter 230 is aligned with and facing the camera's light beam sensor 52. Camera light beam emitter 110 and camera light beam sensor 52 comprise elements of the camera's light beam auto-focus system when a camera mode selector 60 is selected to be in the auto-focus ("F") mode. Details of the light beam auto-focus mode of the camera 1 are provided in the detailed description with respect to FIG. 6. With mode selector 60 in the communication ("C") mode, as shown in FIG. 2, the camera light beam emitter 110 and light beam sensor 52 function as a light beam communication means linking the camera to computer 200 in the communication mode. The communication mode has at least the following objectives: (a) for a photographer using computer 200 to extract diagnostic information related to the status of camera 1 as provided by camera microprocessor and erasable electrically programmable read-only memory (EEPROM), designated at 12; (b) for the computer 200 via a program disk in a disk drive 202 and via a keyboard 204 to transmit to the EEPROM and microprocessor 12 of camera 1 new or varied program update information (algorithms) suitable in unusual picture-taking situations; (c) for computer 200 to request transmission of image information from camera 1 if the camera is an electronic camera (as described in detail with reference to FIG. 4); and (d) for computer 200 to modify or change the instructions to camera microprocessor and EEPROM 12 in response to viewing the image information on a display screen 206 of computer 200.

Figure 3:
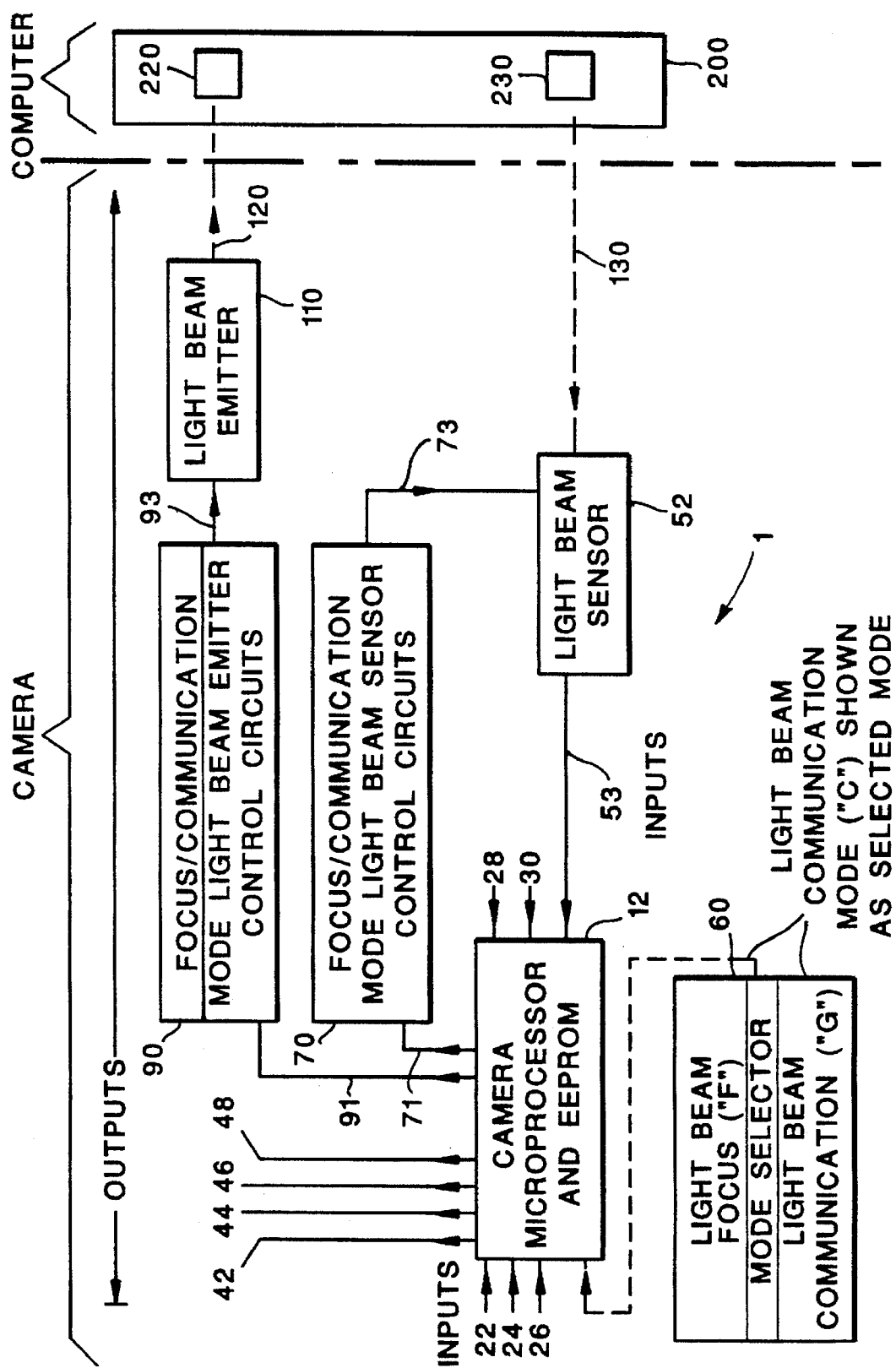
FIG. 3 is a block diagram of the major camera components shown in a light beam communication mode, communicating with a computer in accordance with the present invention.

Referring now to FIG. 3, in conjunction with FIG. 2, there is provided further detail of the light beam communication linkage between a camera 1 and a computer 200. A mode selector 60, shown in the light beam communication ("CC") mode, provides an enabling signal to an input of camera microprocessor and EEPROM 12. The enabling "communication mode" input signal can be, for example, a voltage level signal having a "high" value of 5 volts, corresponding to a digital level "1." Alternatively, an enabling "auto-focus mode" input signal can be a voltage level signal having a "low" value, corresponding to a digital level "0." In response to that communication input signal, microprocessor 12 provides output signals via output connections 71 and 91, respectively, to activate light beam sensor control circuits 70 and light beam emitter control circuits 90, respectively. The output of light beam sensor control circuits 70 controls the operation of light beam sensor 52 via electrical connection 73, and the signal output from light beam sensor 52 is directed by connecting lead 53 to an input of camera microprocessor and EEPROM 12. Light beam emitter control circuits 90 control light beam emitter 110 via lead 93 to emit a coded light beam. Inputs 22, 24, 26, 28, and 30, as well as outputs 42, 44, 46, and 48 of camera microprocessor and EEPROM 12 are the inputs and outputs, respectively, of the conventional automated camera shown in FIG. 1.

Conventional computer 200, which may be a desktop or a so-called laptop computer, is adapted for light beam communication with camera 1 by providing a computer light beam sensor indicated at 220, responsive to coded light beam 120 emitted by camera light beam emitter 110. Also, computer 200 has a light beam emitter designated at 230, and selected to emit a coded light beam 130 to which camera light beam sensor 52 is responsive.

Figure 6:
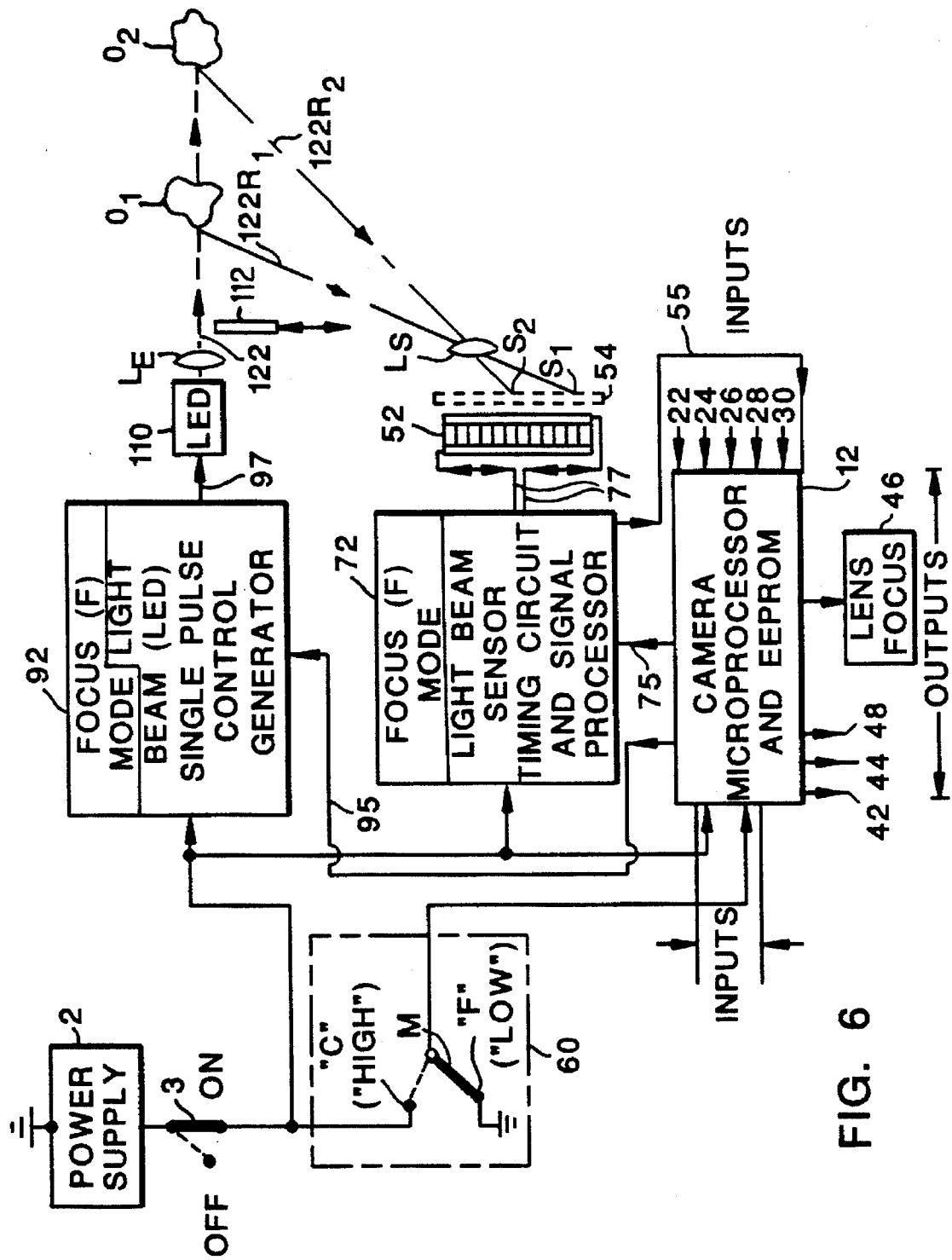
FIG. 6 is a block diagram of an automated camera having a light beam emitter and a light beam sensor shown in an automatic-focus mode.

As indicated previously, light beam sensor 52 and light beam emitter 110 and associated control circuits are already provided in camera 1 as elements of a light beam auto-focus system (see description relating to FIG. 6 for details). Accordingly, only computer 200 needs to be adapted to receive and to transmit coded light beam signals. Light beams 120 and 130 are preferably emitted by light emitting diode (LED) light sources which can have a visible light wavelength, for example, red light of wavelength greater than about 630 nanometers, or they can be LEDs emitting light of a wavelength in the infrared region of the spectrum, for example, a wavelength range between 750 and 1000 nanometers. Since the camera light beam emitter 110 and the camera light beam sensor 52 provide at least an overlap of wavelengths required in the light beam auto-focus ("F") mode of the camera, it is important to select computer light beam sensor 220 and computer light beam emitter 230 to provide sufficient spectral overlap between the camera's emitted light beam 120 and computer light beam sensor 220, and between the spectral response of camera light beam sensor 52 and light beam 130 emitted by computer light beam emitter 230, so as to insure optimum spectral compatibility of the light beam communication between and among the camera 1 and the computer 200 when the camera and the computer are suitably oriented with respect to each other in the light beam communication ("C") mode. If camera light beam emitter 110 and camera light beam sensor 52 are operative in the infrared wavelength region, computer light beam sensor 220 and computer light beam emitter 230 would preferably also be operative in the same infrared spectral region. Regarding the function and performance of particular infrared communication interfaces, they are reviewed, for example, in an article titled, *An Infrared Link for Low-Cost Calculators and Printers*, in the Hewlett-Packard Journal of October 1987, pp. 16–20, by S. L. Harper, R. S. Worsley, and B. A. Stephens. Another particular infrared interface between a computing system and a hand-held computing system is disclosed in U.S. Pat. No. 5,237,663, issued Aug. 17, 1993 to R. Srinivasan, titled, "Low Cost Diagnostic/Configuration Interface," in which the infrared interface can be fully duplex, allowing requests for diagnostic information to be made by a hand-held computing system, or alternatively, the infrared interface may be used to download data and programming code from the computing system to the hand-held computing system and for the computing system to receive data from the hand-held computing system. These aforementioned infrared interfaces use a carrrier frequency signal which is modulated or encoded with the digital data information to be communicated between and among the two computing systems.

In contrast to these particular and dedicated infrared interfaces, the instant invention has as its key feature the deployment of a camera-based light beam emitter and a light beam sensor in automated cameras using a light beam based auto-focus function, and thereby to provide, through a mode selection in conjunction with a camera-based microprocessor and EEPROM and with associated control circuits, the light beam communication mode between the camera and a suitably adapted computer. Furthermore, in the instant invention the camera-based light beam emitter and a computer-based light beam emitter provide digital data information by direct digital encoding of these light beams in the communication mode, thereby obviating the carrier frequency signal and the modulators and demodulators associated therewith in the particular infrared interfaces disclosed in the above publications.

Referring again to FIGS. 2 and 3, the light beam communication linkage between the camera 1 and the computer 200 is initiated by inserting appropriate software contained on a floppy disk (not shown) into disk drive 202 of computer 200, followed by appropriate instructions entered at computer keyboard 204. These instructions are entered into a random access memory (RAM) of computer 200 and upon entering a "transmit" command, the computer light beam emitter 230 is actuated to send coded digital information via light beam 130 to camera light beam sensor 52 and through its output line 53 to the EEPROM of camera microprocessor 12. The coded light beam communication from computer 200 to camera 1 may be in the form of request for camera status information such as, for example, to confirm the camera algorithms presently contained within the EEPROM of camera microprocessor 12.

This coded request from computer 200 would prompt camera microprocessor 12 to actuate light beam emitter control circuits 90 in the communication mode and to transmit a coded digital signal or a coded response via light beam 120 generated by camera light beam emitter 110, and to be received by computer light beam sensor 220. That camera-based response is processed by suitable conventional digital light beam signal processing circuitry and displayed on computer display 206 for view by the user, thereby providing information to the user about the camera status.

Alternatively, the camera user may anticipate using camera 1 under unusual photographic conditions (for example, a photographic scene in a subduely lighted ballroom at a festive event) whereby such unusual lighting conditions had been experienced by the camera user once before. Thus, the camera user may recall the particular operating characteristics or algorithms of camera 1 which provided pictures pleasing to the user at the time. Accordingly, the camera user can input instructions on keypad 204 of computer 200 to download new or modified exposure algorithms to camera microprocessor and EEPROM 12, these algorithms having resulted in pictures judged pleasing by the camera user under similar photographic circumstances in the past. Upon downloading new or revised exposure algorithms, the computer can be directed to request confirmation of the downloading process from the camera. That confirmation is again communicated to computer light beam sensor 220 via camera light beam emitter 110, which derives its control signals from light beam emitter control circuits 90 whose input is connected by lead 91 to an output of camera microprocessor 12.

More detailed information on the light beam communication between computer 200 and camera 1 will be discussed in conjunction with the computer communication flowchart of FIG. 7.

Figure 4:
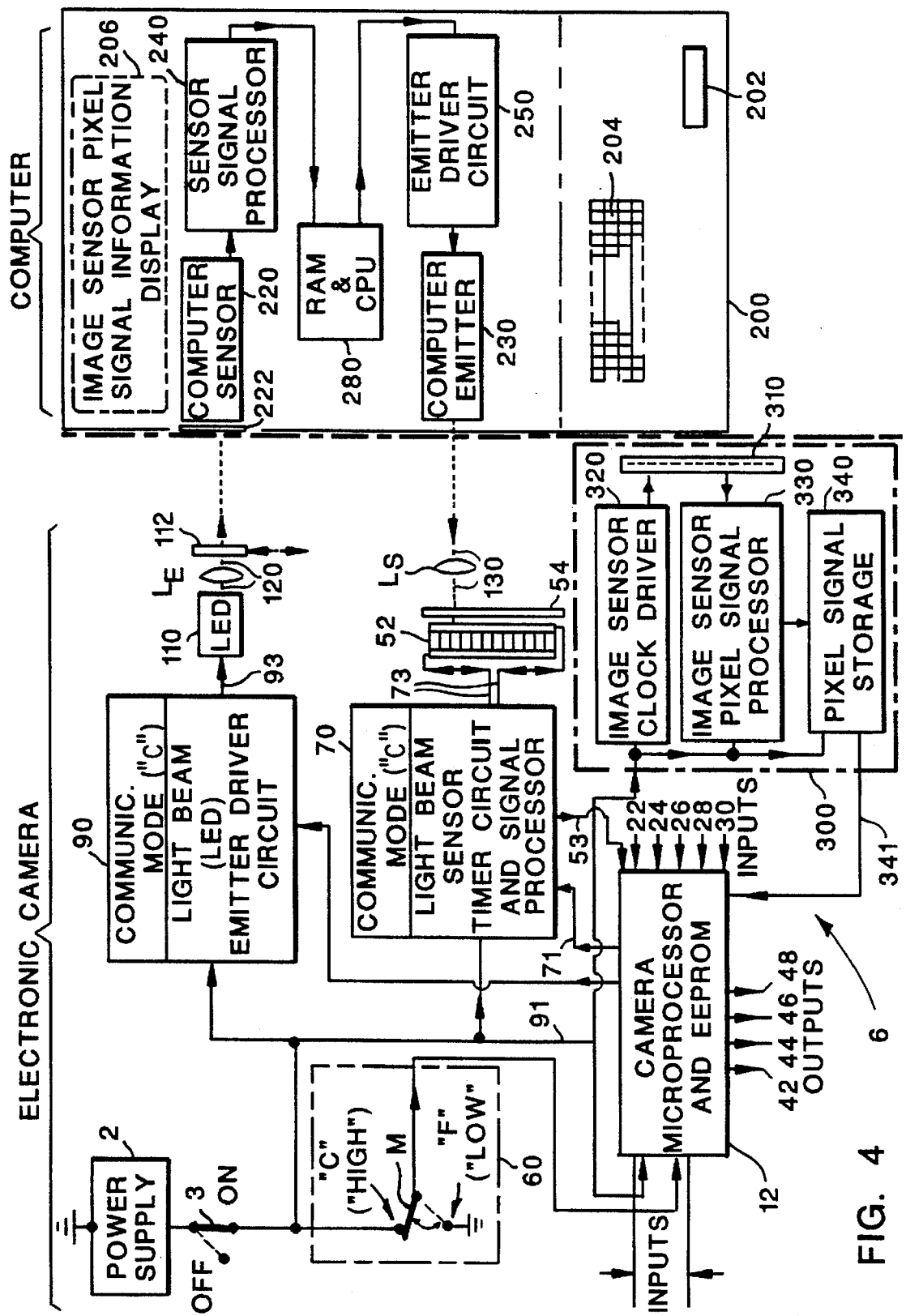
FIG. 4 depicts an electronic camera incorporating a solid-state charge coupled device (CCD) area image sensor for capturing a photographic scene, and shown in the light beam communication mode between the camera and a computer adapted to light beam communication with the camera in accordance with the present invention.

Referring now particularly to FIG. 4, there is shown a schematic block diagram of an electronic camera 6 (also referred to as a CCD-camera). A solid-state imager portion 300 of the electronic camera 6 is of conventional design, such as, for example, found in an Eastman Kodak Company model DSC200 electronic camera. Solid-state imager portion 300 has schematically indicated a CCD area image sensor 310 driven by an image sensor clock driver 320, and generating image sensor pixel outputs directed into an image sensor signal processor 330 which provides image pixel information into a pixel signal storage 340. These pixel signals can be read out from storage 340 via lead 341 to a dedicated input of camera microprocessor and EEPROM 12.

A conventional camera power supply 2 such as, for example, a battery power supply, is connected through a camera on-off switch 3 to all components of the electronic camera 6. A mode selector 60 selectably switches the camera between a communication mode "C" and an auto-focus mode "F," the mode selector switch M being shown in the communication mode "C." In this mode, mode selector switch M connects the voltage of power supply 2 (camera on-off switch 3 in the "ON" position) directly to an input of microprocessor and EEPROM 12 as a "HIGH" level signal corresponding to a digital level "1," whereby the microprocessor and EEPROM 12 is actuated to provide control signals to light beam emitter driver circuit 90 via connecting lead 91, and to light beam sensor timer circuit and signal processor 70 via connecting lead 71. The microprocessor additionally has inputs 22, 24, 26, 28, and 30 and outputs 42, 44, 46, and 48 discussed with reference to the prior art automated camera of FIG. 1.

A light beam sensor 52 is indicated to be a linear charge-coupled device image sensor of a design preferred in range finder type auto-focus applications in an automated camera. This type of linear charge-coupled device range finder sensor operates in conjunction with a light beam emitter (see discussion related to FIG. 6) as, for example, disclosed in U.S. Pat. No. 4,490,036, issued Dec. 25, 1984 to Constantine Anagnostopoulos, titled, *Image Sensor And Rangefinder Device Having Background Subtraction With Paired Analog Shift Registers*. However, with mode selector 60 in the communication mode "C," light beam sensor 52 is preferably operated in a DC fashion, rather than in a clocked fashion, thereby effectively providing a uniform sensor by connecting all photo diodes of this linear imager in parallel. To operate light beam sensor 52 in a DC fashion, the function of the sensor signal processing electronics detailed in the circuit schematic of FIG. 6 of the aforementioned U.S. Pat. No. 4,490,036 is modified in the communication mode by having camera microprocessor and EEPROM 12 provide "high" signal levels to selected inputs and to provide "low" signal levels to other selected inputs of the sensor signal processing electronics. With particular reference to the FIG. 6 of U.S. Pat. No. 4,490,036, the following input signal settings are provided to the respective inputs of the sensor signal processing electronics to effect the preferred DC fashion operation of light beam sensor 52 in the communication mode of the camera: inputs $\phi_3$ and $\phi_4$ of respective shift registers 24 and 24' are set "high"; inputs $\phi_R$ are set "low"; inputs $\phi_{E1}$ and $\phi_{E2}$ are set "high"; input $\phi_{CL}$ is set "low"; input $\phi S/H$ is set "high"; inputs $\phi$ and $\phi_S$ are set "low"; and input $\phi_T$ is set "high" during the time period when the camera's light beam emitter 110 transmits coded light beam signals to the light beam sensor 220 of computer 200, and input $\phi_T$ is set low during the time period when the camera's light beam sensor 52 receives coded light beam signals from the light beam emitter 230 of computer 200. In the communication mode "C" of electronic camera 6 (and of film-based camera 1), these modified input signals provide the preferred operation of light beam sensor 52 in the DC fashion. In the automatic focus mode ("F") of the camera 6 (and of camera 1), the sensor signal processing electronics remains unmodified and functions as described in U.S. Pat. No. 4,490,036.

Accordingly, when the camera 6 (or the camera 1) is in the light beam communication mode "C," the light beam sensor timing circuit and signal processor 70 (referred to as sensor signal processing electronics in the aforementioned U.S. Pat. No. 4,490,036) of the camera controls the light beam sensor 52 to be operative in a fashion distinct from the operative fashion of the sensor when the camera is in the light beam auto-focus mode.

Light beam sensor 52 is actuated by a light beam sensor timing circuit and signal processor 70 via leads 73. Timing circuit and signal processor 70 is actuated by commands from an output of microprocessor 12 via lead 71, and the timing circuit and signal processor 70 has a signal output connected to a dedicated input of microprocessor 12 via lead 53. A lens $L_s$ is positioned in front of light beam sensor 52 to collimate or to focus coded light beam 130 transmitted from a computer-based light emitter 230. Lens $L_s$, as well as a lens $L_e$ in the emitter light beam 120 are lenses also deployed in the light beam auto-focus mode "F" described in conjunction with FIG. 6.

Light beam emitter 110 is driven via lead 93 by a light beam emitter driver circuit 90 which is actuated by a dedicated output of microprocessor 12 via lead 91. The digital output of microprocessor 12 is controlled by light beam emitter driver circuit 90 so that light beam 120 emitted by light beam emitter 110 (such as a light emitting diode or LED) is digitally coded to convey information to a computer-based light beam sensor 220. A diffuser 112 may be selectably inserted in the light beam 120 when the camera is in the light beam communication mode, so as to provide in that mode a diffuse, spatially broadened light beam 120 directed at computer-based light beam sensor 220. Selectable insertion of diffuser 112 may be provided by a conventional solenoid (not shown) which is actuated, for example, when mode selector switch M of mode selector 60 is switched to the light beam communication mode "C." Also indicated are optical band pass filters 54 and 222, disposed in proximity to light beam sensors 52 and 220, respectively. These filters, for example, so-called notch filters, are conventional filters designed to transmit light of the wavelength range provided by light beams 130 and 120, respectively, and to reduce or block potentially present stray light, for example, fluorescent room light, during the light beam communication between and among the camera 6 (or camera 1) and the computer 200.

A conventional computer 200 has a disk drive 202, keyboard 204, and a display screen 206, as well as conventional computer RAM and CPU 280. To provide a light beam communication link between the electronic camera 6 and computer 200, the computer is adapted for light beam communication by incorporating a "computer-based" light beam sensor 220, a sensor signal processor 240, and a "computer-based" light beam emitter 230. Light beam sensor 220 provides digital signals to the random access memory 280 of the computer, the signals being representative of the digital encoding provided by camera light beam 120. Likewise, digital data outputted from RAM 280 are amplified by a light beam emitter driver circuit 250 to provide a digitally encoded light beam 130 emitted by "computer-based" light beam emitter 230.

The terms "computer-based" with reference to computer light beam sensor 220 and computer light beam emitter 230 are meant to indicate that the digital information carded by encoded light beams 120 and 130 is ultimately directed into and provided by the random access memory (RAM) 280 of computer 200. This digital signal storage and retrieval step in RAM 280 can, of course, be achieved by attaching light beam sensor 220 and light beam emitter 230 and associated circuits as modules located physically outside computer 200, so long as suitable connections are provided to RAM 280 within computer 200.

One key feature of the light beam communication system of the present invention as it relates to the electronic camera 6 is provided by the facility to transmit image information from the camera via light beam 120 upon a command from computer light beam emitter 230 via light beam 130. This image information is accessible via the pixel signal data stored in pixel signal storage 340 of solid-state imager 300, and provided to an input of camera microprocessor and EEPROM 12. Thus, either an image or a fractional image, or an optical density distribution or other characteristic feature of the image captured by CCD imager 310 can be displayed for visual characterization on computer display 206. Therefore, in the light beam communication mode of the present invention a camera user can make intelligent decisions regarding the rendition of a displayed photographic image of a scene or of characteristic features related to the scene just photographed, and can, based on that visual observation, decide to reprogram the camera algorithm so as to provide an improved rendition of the same scene during the next exposure.

Another important aspect of the invention as it relates to the electronic camera 6 is provided by the CCD area image sensor 310 of solid-state imager portion 300. By incorporating features of the light beam sensor timer circuit and signal processor 70 into the image sensor clock driver 320 and into the image sensor pixel signal processor 330, respectively, at least a portion of the CCD area image sensor 310 can be operative as the light beam sensor in the electronic automated camera 6. Thus, CCD area image sensor 310 is operative as an area image sensor during the capture of an image or photographic scene, and at least a portion of area image sensor 310 is operative as the light beam sensor in both the camera's communication ("C") and auto-focus ("F") modes. Using CCD area image sensor 310 in these modes, as well as for image capture, is advantageous in that one camera sensor can perform the light beam and image capture functions, rather than splitting these functions among the two sensors 52 and 310, respectively.

Figure 5:
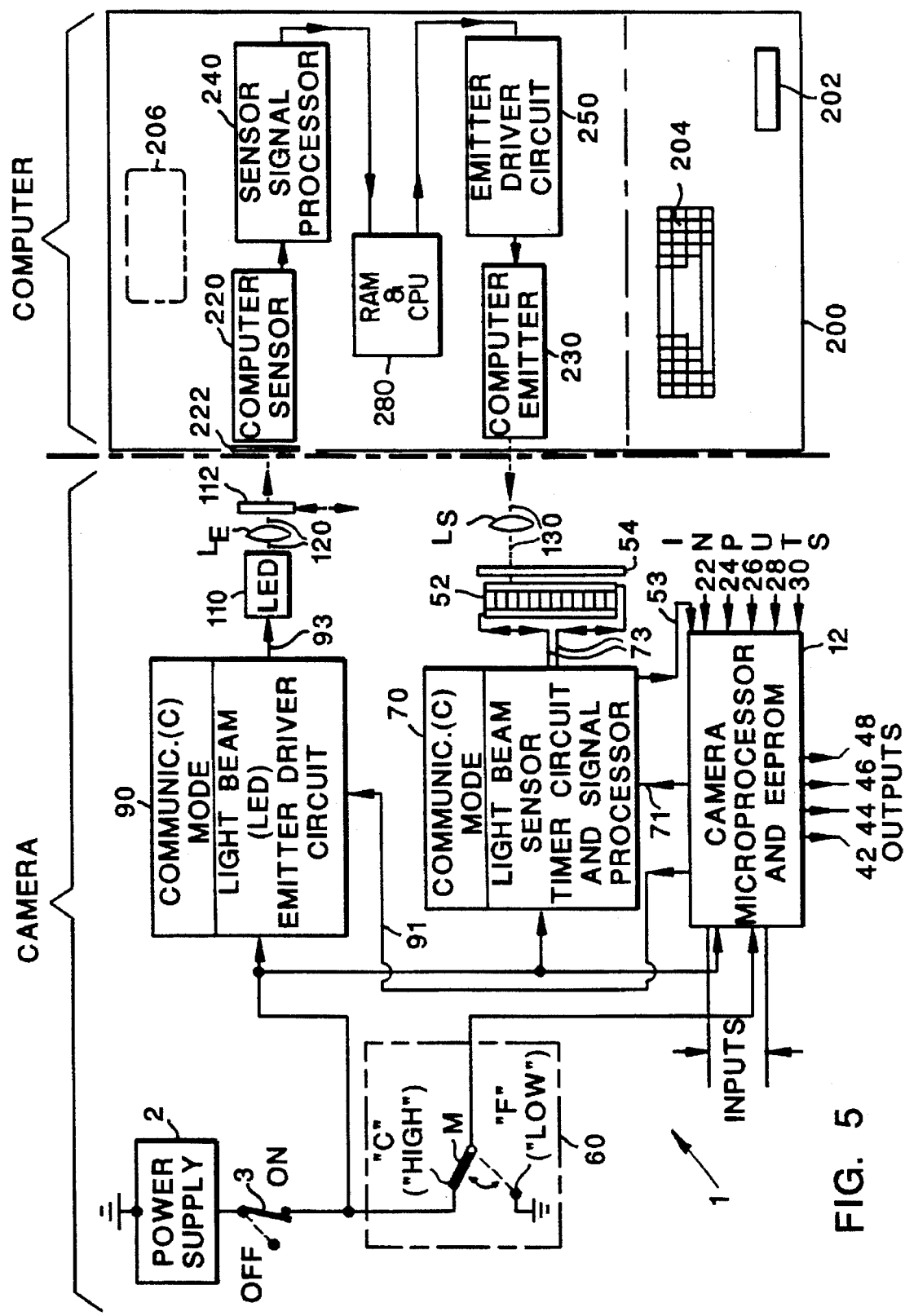
FIG. 5 is a block diagram of an automated conventional film-based camera having a light beam emitter and a light beam sensor, and shown in a light beam communication linkage with a computer adapted to light beam communication with the camera.

Referring now to FIG. 5, there is shown a functional block diagram of an automated camera 1 with a mode selector 60 indicated in the communication mode "C." Camera 1 of FIG. 5 differs from the electronic camera 6 of FIG. 4 in that camera 1 is a conventional automated camera using film, rather than a solid-state CCD area image sensor 310. All other elements in FIG. 5 are identical to the elements of FIG. 4. The light beam communication linkage between camera 1 and computer 200 also functions identically to that of FIG. 4, except that, of course, a film-based recording medium (not shown in FIG. 5) cannot communicate image information to the display 206 of computer 200.

Referring now to FIG. 6, there is shown the auto-focusing mode "F" of an automated camera as described previously and using the camera light beam emitter 110 (shown as an LED), lenses $L_e$ and $L_s$, as well as light beam sensor 52 and camera microprocessor and EEPROM 12. Light beam sensor 52 now functions as a range-finder sensor preferably in the manner disclosed in U.S. Pat. No. 4,490,036, issued Dec. 25, 1984 to Constantine Anagnostopoulos, titled, *Image Sensor And Rangefinder Device Having Background Subtraction With Paired Analog Shift Registers*. In the auto-focus mode "F," a "low" enabling signal is provided by switch M of mode selector 60 to an input of camera microprocessor and EEPROM 12. This "low" input produces a microprocessor output which actuates via lead 95 a light beam single-pulse control generator 92 and thereby actuates light beam emitter (LED) 110 to provide a single-pulse light beam 122 directed via lens $L_e$ at photographic or scene objects $O_1$ or $O_2$. A portion of single-pulse light beam 122 is reflected off objects $O_1$ or $O_2$ as beam 122 $R_1$ and 122 $R_2$, respectively, and these reflected beam portions are directed by lens $L_s$ onto linear charge-coupled device light beam sensor 52. Light beam sensor 52 is driven by a light beam sensor timing circuit and signal processor 72 via connecting leads 77, the system and function of the sensor 52 and the timing circuit and signal processor 72 being described in detail in the aforementioned U.S. Pat. No. 4,490,036, issued Dec. 25, 1984 to Anagnostopoulos. A peak signal (reflective of the sensor locations $S_1$, $S_2$ at which beam portions 122$R_1$, 122$R_2$, respectively, are incident on light beam sensor 52) is detected and is processed in the signal processor component of the light beam sensor timing circuit and signal processor 72. Timing circuit and signal processor 72 are activated by an output from microprocessor 12 via lead 75, and a processed focus signal output is directed to an input of microprocessor 12 via lead 55. That focus signal causes microprocessor 12 to produce an output signal which is applied to a conventional camera lens focus mechanism 46.

Thus, when mode selector 60 is used to select the original light beam auto-focus mode "F" of the automated conventional camera described previously, the same light beam emitter 110 and light beam sensor 52 are deployed, the difference being that light beam emitter 110 is operated in the single-pulse light beam mode and the light beam sensor 52 is driven by a timing circuit for a CCD clock driver in the auto-focus mode of the camera, compared to the communication mode, in which the light beam sensor is operative in a DC fashion and light beam emitter 110 is operated with particular pulse sequences corresponding to digital signal information provided by microprocessor and EEPROM 12.

Figure 7B:
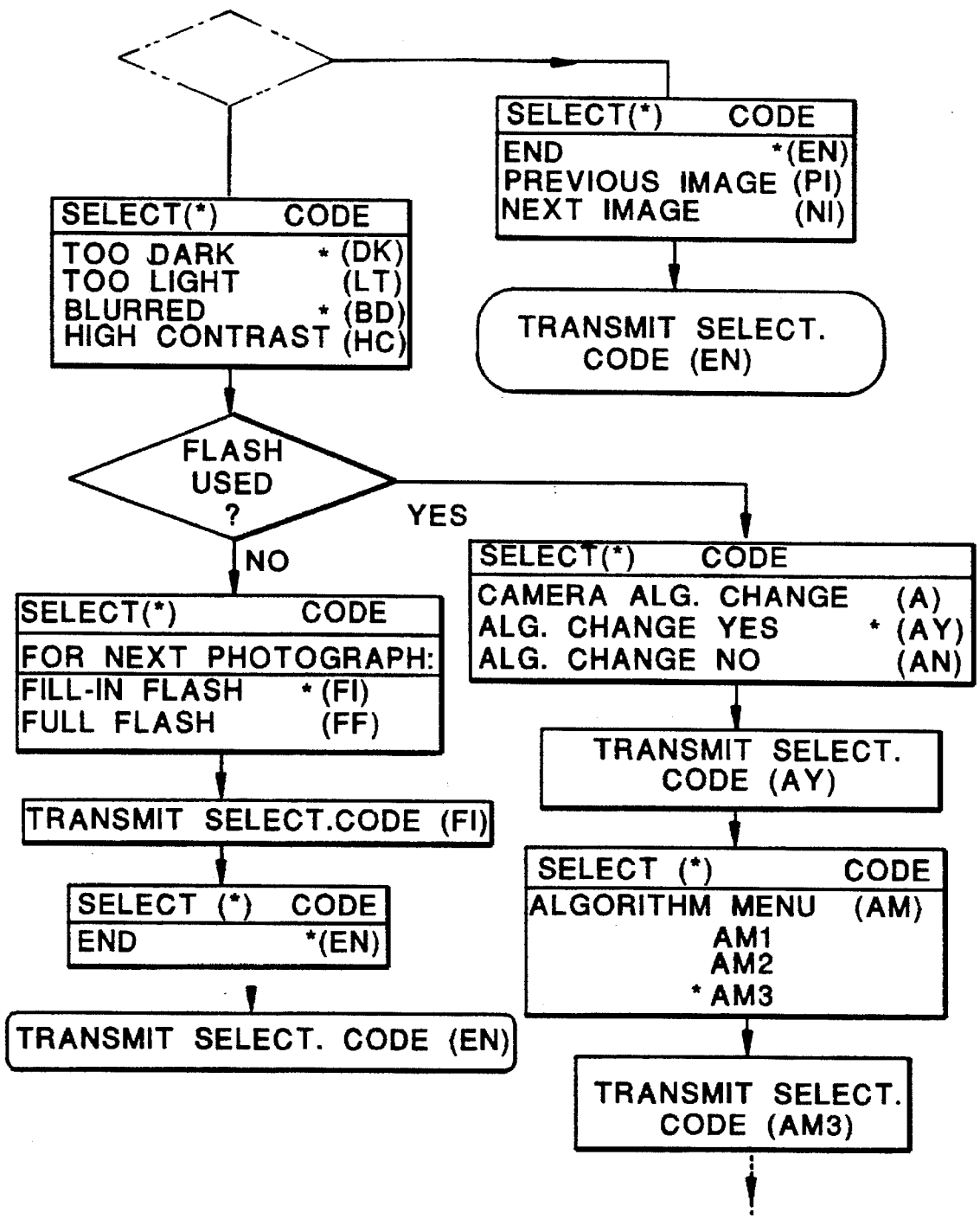
FIG. 7 is an example of a flow diagram of communication commands transmitted by the light beam emitter of the computer to the light beam sensor of the camera and thereby to the erasable electrically programmable read-only memory (EEPROM) of the camera.

Referring now to FIG. 7, there is shown a flow diagram of commands issued by the camera user on the keyboard 204 of computer 200 upon insertion of a program disk in disk drive 202. These commands are digitally encoded into light beam 130 emitted by computer-based light beam emitter 230 and directed toward light beam sensor 52 of the camera when the camera mode selector 60 is in the communication mode "C," and when the computer and the camera are oriented appropriately as shown in FIG. 2. The flow diagram is directed particularly at the electronic camera 6 shown in FIG. 4, and more particularly at the selection of viewing images or image information stored in pixel signal storage 340 of the solid-state imager portion 300 of camera 6. The main object of the flow diagram of FIG. 7 is to provide an example of commands to initiate in camera microprocessor and EEPROM 12 the release of image pixel information reaching microprocessor 12 via lead 341, and to transmit that image pixel information to the display screen 206 of computer 200 by the camera light beam emitter 110, so that the image information can be viewed by the user to arrive at a subjective judgment about the quality of a given selected image. More particularly, the user can elect to hold a selected image or image information on data display 206 for a period sufficient to make a judgment about the image quality. If the viewed image or image information is judged to be satisfactory, the communication from the computer to the camera can be ended. However, if requested image viewing does not result in images displayed on display 206, the user may select a camera diagnostic code and select from a menu of diagnostic codes to interrogate the camera status, including the interrogation of camera algorithms stored in microprocessor 12. Alternatively, when image information is transmitted from the camera 6 to computer 200 upon transmission of select code ("T"), and if the image quality is judged by the user to be inadequate, the user can direct the computer to communicate to the camera microprocessor 12 various observations about the perceived image quality. In the example shown in FIG. 7, the image was judged to be both too dark ("DK") and blurred ("BD"). Accordingly, the computer-based software inquires about whether a flash was used during the picture taking which produced that image. From this decision tree flow two options, namely a suggestion to use a fill-in flash when taking the next photograph of a photographic scene similar to the one being viewed on display 206 and subsequent communication of that decision to microprocessor 12 of camera 6. Alternatively, if, a flash had been used to produce the image being viewed, then the user may choose to instruct the camera microprocessor and EEPROM 12 to modify or change a camera algorithm or to select a particular algorithm to be transmitted from computer 200 to microprocessor 12, so that any one or several of the outputs 42, 44, 46, and 48 of microprocessor 12 can be changed in response to the algorithm menu chosen by the user on the computer. In this manner, algorithms different from those originally stored in microprocessor 12 can be communicated to the microprocessor and EEPROM to adapt the camera to unusual photographic situations which would fall outside the "photographic space" represented by the camera algorithms resident in the PROM of a conventional prior art automated camera (see FIG. 1).

It will be apparent to experts in computer programming that particular code letters shown in FIG. 7 can be translated into digital signals or into digital code by a number of techniques well known in the field of computer science and technology, including a conventional serial data coding protocol similar to that implemented in an RS-232 communication interface. Accordingly, FIG. 7 is merely an illustration showing the possibilities of initiating communication from the computer to the camera to instruct camera 6 to provide to the computer by the light beam communication system of the present invention information about camera diagnostic features, camera algorithm change features, and image features.

When the EEPROM and microprocessor 12 of camera 6 (or camera 1, shown in FIGS. 2, 3, and 5, as related to camera diagnostic features and camera algorithm change features) receives the computer initiated commands, camera microprocessor 12 will respond to each command and transmit the requested information by way of digitally encoded light beam 120 to computer light beam sensor 220 for processing and signal storage in computer RAM 280 and for display on computer display 206. It will be appreciated that the output of camera microprocessor 12 provides a digital signal to the input of light beam emitter driver circuit 90 via lead 91. Emitter driver circuit 90 controls light beam emitter 110 so that light beam emitter 110 can emit a light beam 120 having appropriately coded light beam signals reflective of the digital signal information coming from microprocessor 12.

The central feature of the present invention is to provide a method and system for light beam communication between a camera and a computer by adapting an existing light beam auto-focus system of a conventional automated camera, for example, a conventional automated camera using film or a conventional automated electronic camera, and by adapting a conventional computer to provide a light beam communication linkage with the adapted camera. The light beam auto-focus system of such automated camera is modified to include a mode selector providing a selection of the conventional light beam auto-focus mode and alternatively for selection of a light beam communication mode. The camera is provided with a camera microprocessor and an erasable electrically programmable read-only memory (EEPROM). In the light beam communication mode, a light beam emitter driver circuit and a light beam sensor timing circuit and signal processor are provided. A conventional computer, for example, a desktop computer or a laptop computer, is adapted to receive and to transmit optically encoded digital signals whereby a computer-based light beam sensor and light beam emitter have an optical spectrum overlapping with the optical spectrum of the camera-based light beam emitter and light beam sensor. Light beam communication is initiated by suitable commands provided by a camera user to the computer. The camera microprocessor is responsive to such commands, and that response is transmitted by the camera-based light beam emitter back to the computer-based light beam sensor.

It is to be understood that the particular embodiments detailed herein are merely illustrative of the general principle of the present invention. Various modifications and other arrangements can be contemplated without departing from the spirit of the invention. For example, various known approaches to encoding or modulating communicative light beams can be advantageously used in the practice of the invention. It is also possible within the spirit and scope of the invention to use a camera light beam sensor of a type different from a linear charge-coupled device image sensor, providing such different type light beam sensor can function in the light beam auto-focus mode of the conventional automated camera. Likewise, various modifications will suggest themselves to those skilled in this an pertaining to those elements within the camera and within the computer, which are dedicated to the light beam communication linkage between and among the camera and the computer.

PARTS LIST

| | |
|---|---|
| 1 | automated camera (light beam communication mode) |
| 2 | camera power supply |
| 3 | camera on-off switch |
| 6 | electronic camera |
| 10 | camera microprocessor and PROM (prior art) |
| 12 | camera microprocessor and EEPROM |
| 22 | exposure sensor input |
| 24 | film speed indicator input |
| 26 | film type indicator input |
| 28 | flash control input |
| 30 | user interface input |
| 42 | lens aperture output |
| 44 | shutter speed output |
| 46 | lens focus output |
| 48 | flash output |
| 50 | focus sensor input |
| 52 | camera light beam sensor |
| 53 | connecting lead |
| 54 | optical band pass filter |
| 55 | connecting lead |
| 56 | circuit board substrate |
| 60 | mode selector |
| 70 | light beam sensor control circuits |
| 71 | connecting lead |
| 72 | light beam sensor timing circuit and signal processor |
| 73 | connecting leads |
| 75 | connecting lead |
| 77 | connecting leads |
| 90 | light beam emitter driver circuit |
| 91 | connecting lead |
| 92 | light beam single pulse control generator |
| 93 | connecting lead |
| 95 | connecting lead |
| 97 | connecting lead |
| 110 | camera light beam emitter |
| 112 | light diffuser |
| 120 | coded camera light beam (communication mode "C") |
| 122 | single pulse camera light beam (auto-focus mode "F") |
| $122R_1$ | reflected portion of single pulse camera light beam |
| $122R_2$ | reflected portion of single pulse camera light beam |
| 130 | coded computer light beam |
| 200 | computer |
| 202 | disk drive |
| 204 | keyboard |
| 206 | display screen |
| 220 | computer light beam sensor |
| 222 | optical band pass filter |
| 230 | computer light beam emitter |
| 240 | sensor signal processor |
| 250 | emitter signal driver circuit |
| 280 | computer RAM and CPU |
| 300 | solid-state imager portion |
| 310 | CCD area image sensor |

PARTS LIST-continued

- 320 image sensor clock driver
- 330 image sensor signal processor
- 340 pixel signal storage
- 341 connecting lead
- "C" communication mode
- "F" auto-focus mode
- $L_e$ optical lens (light beam emitter)
- $L_s$ optical lens (light beam sensor)
- M mode selector switch
- $O_1$ photographic object
- $O_2$ photographic object
- $S_1$ sensor location of reflected light beam $122R_1$
- $S_2$ sensor location of reflected light beam $122R_2$

What is claimed is:

1. A light beam communication method for linking a camera and a computer, the method comprising the steps of:

providing an automated, electronic camera of the type having a charge-coupled device (CCD) area image sensor with associated image sensor clock driver, image sensor pixel signal processor and pixel signal storage, the camera further having a microprocessor and a non-volatile erasable electrically programmable read only memory (EEPROM) automatically controlling camera output functions in response to camera input functions, and having a microprocessor controlled light beam auto-focus system including a light beam emitter, a light beam sensor, and emitter light beam control circuit means and sensor light beam control circuit means associated therewith;

providing a mode selector selectably operable by a camera user to select a light beam communication mode for the light beam emitter and the light beam sensor;

adapting the emitter light beam control circuit means and the sensor light beam control circuit means of the light beam emitter and the light beam sensor to become enabled and operative in the light beam communication mode upon actuation of the microprocessor and EEPROM by an input signal applied thereto by the mode selector;

providing a computer of the type capable of interfacing with a user-supplied program, and having a keyboard and a display;

adapting the computer to provide a computer-based light beam emitter, a computer-based light beam sensor, and respectively associated control circuits, the computer-based light beam emitter capable of transmitting an information encoded light beam being spectrally matched to the camera light beam sensor, and the computer-based light beam sensor being spectrally responsive to an information encoded light beam transmitted by the camera light beam emitter;

positioning the camera and the computer so that the light beam transmitted by the computer is incident on at least a portion of the camera light beam sensor and the light beam transmitted by the camera is incident on at least a portion of the light beam sensor of the computer;

generating commands on the computer from the user-supplied program, including commands directing the camera to communicate to the computer image information related to information in the pixel signal storage and a status report about the camera's automatically controlling functions, and commands directing the camera's microprocessor and EEPROM to change selected ones of the camera's automatically controlling functions;

transmitting the commands via the computer light beam emitter as a coded light beam to the camera light beam sensor to actuate the microprocessor and EEPROM to respond to the commands;

receiving in the computer-based light beam sensor a coded light beam from the camera light beam emitter, the coded light beam including the response of the camera microprocessor to the commands;

displaying the camera response on the display for evaluation by the user; and selecting by the mode selector the light beam auto-focus mode of the automated camera prior to using the camera.

2. A light beam communication system of linking a camera and a computer, comprising:

an automated electronic camera of the type having a charge-coupled device (CCD) area image sensor with associated image sensor clock driver, image sensor pixel signal processor and pixel signal storage, the camera further having a microprocessor and a non-volatile erasable electrically programmable read only memory (EEPROM) automatically controlling camera output functions in response to camera input functions, and having a microprocessor controlled light beam auto-focus system including a light beam emitter, a light beam sensor, and emitter light beam control circuit means and sensor light beam control circuit means associated therewith;

a mode selector selectably operable by a camera user to select a light beam communication mode for the light beam emitter and the light beam sensor;

the emitter light beam control circuit means and the sensor light beam control circuit means of the light beam emitter and the light beam sensor adapted to become enabled and operative in the light beam communication mode upon actuation of the microprocessor and EEPROM by an input signal applied thereto by the mode selector;

a computer of the type capable of interfacing with a user-supplied program, and having a keyboard and a display;

the computer adapted to provide a computer-based light beam emitter, a computer-based light beam sensor, and respectively associated control circuits, the computer-based light beam emitter capable of transmitting an information encoded light beam being spectrally matched to the camera light beam sensor, and the computer-based light beam sensor being spectrally responsive to an information encoded light beam transmitted by the camera light beam emitter;

means for positioning the camera and the computer so that the light beam transmitted by the computer is incident on at least a portion of the camera light beam sensor and the light beam transmitted by the camera is incident on at least a portion of the light beam sensor of the computer;

means for generating commands on the computer from the user-supplied program, including commands directing the camera to communicate to the computer image information related to information in the pixel signal storage and a status report about the camera's automatically controlling functions, and commands directing the camera's microprocessor and EEPROM to change selected ones of the camera's automatically controlling functions;

means for transmitting the commands via the computer light beam emitter as a coded light beam to the camera light beam sensor to actuate the microprocessor and EEPROM to respond to the commands;

means for receiving in the computer-based light beam sensor a coded light beam from the camera light beam emitter, the coded light beam including the response of the camera microprocessor to the commands;

means for displaying the camera response on the display for evaluation by the user; and switch means for selecting by the mode selector the light beam auto-focus mode of the automated camera prior to using the camera.

3. The light beam communication method of claim 1, wherein the camera providing step includes the step of providing an automated camera of the type using film for image sensing.

4. The light beam communication system of claim 3, wherein at least a portion of the CCD area image sensor is operative as the light beam sensor.

5. The light beam communication system of claim 3, wherein the automated camera is of the type using film for image sensing.

6. The light beam communication system of claim 3, wherein the emitter light beam control circuit means of the camera in the light beam communication mode controls the light beam emitter to emit light beam pulse sequences corresponding to digital signals derived from the camera microprocessor and EEPROM, and wherein the sensor light beam control circuit means of the camera in the light beam communication mode controls the light beam sensor to be operative in a fashion distinct from the operative fashion of the sensor when the camera is in the light beam auto-focus mode.

7. The light beam communication system of claim 3, further including an optical band pass filter disposed in proximity to each one of the camera light beam sensor and the computer-based light beam sensor.

8. A light beam communication system for linking a camera and a computer, comprising:

the computer having a first light beam emitter and a first light beam sensor; and the camera having an image sensor and means for storing images, the camera further having a second light beam emitter and a second light beam sensor and being effective in a first mode for transmitting a light beam and receiving reflected light beam from such beam from a subject for effectively determining auto focus of the camera and means effective after the camera has been adjusted for auto focus for forming images of a subject on the image sensor and for storing data representing such images and the camera being effective in a second mode, after aligning the first light beam emitter of the computer with the second light beam sensor of the camera and the second light beam emitter of the camera with the first light beam sensor of the computer for directly communicating stored image data from the image storage means between the camera and the computer.

9. A light beam communication system of linking a camera and a computer, comprising:

an automated camera of the type having a microprocessor and a non-volatile erasable electrically programmable read only memory (EEPROM) automatically controlling camera output functions in response to camera input functions, and having a microprocessor controlled light beam auto-focus system including a light beam emitter, a light beam sensor, and emitter light beam control circuit means and sensor light beam control circuit means associated therewith;

a mode selector selectably operable by a camera user to select a light beam communication mode for the light beam emitter and the light beam sensor;

the emitter light beam control circuit means and the sensor light beam control circuit means of the light beam emitter and the light beam sensor adapted to become enabled and operative in the light beam communication mode upon actuation of the microprocessor and EEPROM by an input signal applied thereto by the mode selector;

a selectably insertable light diffuser in the light beam transmitted by the camera light beam emitter in the light beam communication mode;

a computer of the type capable of interfacing with a user-supplied program, and having a keyboard and a display;

the computer adapted to provide a computer-based light beam emitter, a computer-based light beam sensor, and respectively associated control circuits, the computer-based light beam emitter capable of transmitting an information encoded light beam being spectrally matched to the camera light beam sensor, and the computer-based light beam sensor being spectrally responsive to an information encoded light beam transmitted by the camera light beam emitter;

means for positioning the camera and the computer so that the light beam transmitted by the computer is incident on at least a portion of the camera light beam sensor and the light beam transmitted by the camera is incident on at least a portion of the light beam sensor of the computer;

means for generating commands on the computer from the user-supplied program, including commands directing the camera to communicate to the computer a status report about the camera's automatically controlling functions, and commands directing the camera's microprocessor and EEPROM to change selected ones of the camera's automatically controlling functions;

means for transmitting the commands via the computer light beam emitter as a coded light beam to the camera light beam sensor to actuate the microprocessor and EEPROM to respond to the commands;

means for receiving in the computer-based light beam sensor a coded light beam from the camera light beam emitter, the coded light beam including the response of the camera microprocessor to the commands;

means for displaying the camera response on the display for evaluation by the user; and switch means for selecting by the mode selector the light beam auto-focus mode of the automated camera prior to using the camera.

* * * * *